United States Patent [19]
Vincent

[11] 3,911,874
[45] Oct. 14, 1975

[54] INTERNAL COMBUSTION ENGINES

[76] Inventor: Philip Conrad Vincent, 7 Kew Bridge Court, London W4 3AE, England

[22] Filed: Aug. 15, 1973

[21] Appl. No.: 388,509

[30] Foreign Application Priority Data
June 15, 1973  United Kingdom............... 28574/73
Feb. 8, 1973   United Kingdom................. 6200/73
July 23, 1973  United Kingdom............... 35094/73
Aug. 16, 1972  United Kingdom............... 38217/72

[52] U.S. Cl. ...... 123/33 VC; 123/32 AA; 123/32 J; 123/32 AH; 123/32 L; 123/30 A; 123/191 A
[51] Int. Cl. .......................... F02b 3/00; F02b 19/16
[58] Field of Search ............ 123/33 D, 32 AA, 32 J, 123/32 C, 191 SP, 191 S, 32 D, 32 K, 32 L, 33 VC, 191 A, 30 A, 32 AH

[56] References Cited
UNITED STATES PATENTS

| | | | |
|---|---|---|---|
| 971,954 | 10/1910 | Wygodsky.......................... | 123/32 C |
| 1,136,818 | 4/1915 | Leissner............................. | 123/32 C |
| 1,945,818 | 2/1934 | McPherson..................... | 123/191 SP |
| 2,054,562 | 9/1936 | Haag................................. | 123/32 C |
| 2,067,461 | 1/1937 | Ramsey............................ | 123/33 VC |
| 2,198,979 | 4/1940 | Schwaiger....................... | 123/33 VC |
| 2,317,536 | 4/1943 | Hocke.............................. | 123/32 A |
| 2,855,908 | 10/1958 | Pflaum............................. | 123/32 J |
| 3,044,454 | 7/1962 | Sutton.............................. | 123/32 J |
| 3,077,868 | 2/1963 | Georges ......................... | 123/33 VC |
| 3,259,116 | 7/1966 | Bricout ............................ | 123/32 C |
| 3,587,533 | 6/1971 | Sarnuskiewicz................. | 123/33 C |
| R18,575 | 8/1932 | Oberhaensli..................... | 123/191 S |

FOREIGN PATENTS OR APPLICATIONS

| | | | |
|---|---|---|---|
| 364,326 | 10/1938 | Italy................................. | 123/32.9 |
| 909,867 | 11/1962 | United Kingdom........... | 123/191 SP |
| 14,605 | 6/1912 | United Kingdom............... | 123/33 C |

*Primary Examiner*—Charles J. Myhre
*Assistant Examiner*—Ronald B. Cox
*Attorney, Agent, or Firm*—Watson, Cole, Grindle & Watson

[57] ABSTRACT

A combustion passage interconnects a fuel ignition chamber and a combustion chamber such that compressed air within the combustion chamber is forced into the ignition chamber along with the pre-heated fuel, and the expansion of the burning air and fuel mixture forces the mixture through the combustion passage into the combustion chamber to complete combustion of the fuel with the air therein. The ignition chamber including the combustion passage is formed from a synthetic ceramic material which has sufficient heat insulating properties to retain the heat emitted by the combusted fuel in the engine for pre-heating the fuel injected into the fuel ignition chamber. At least one groove extends along the combustion passage and has a depth which increases towards the ignition chamber end. An inflexible valve member formed from a synthetic ceramic material extends from the ignition chamber into the combustion passage to close the latter while leaving the groove open. The valve member is adjusted along the axis of the combustion passage to vary the length of the groove covered by the valve member for controlling the flow restriction between the combustion chamber and the ignition chamber.

14 Claims, 10 Drawing Figures

INTERNAL COMBUSTION ENGINES

BACKGROUND OF THE INVENTION

1. Field of the Invention

The invention relates to internal combustion engines and particularly to ignition chamber apparatus for such engines.

2. Description of the Prior Art

In conventional gas engines having spark ignition it is usually necessary to employ a fuel rich mixture to ensure ignition of the fuel particularly when the engine is cold. Because there is insufficient air for complete combustion of the fuel, the exhaust gases contain an excess of carbon monoxide. Furthermore, the temperatures reached in the engine cylinder result in conversion of nitrogen in the air charge to oxides of nitrogen. Both carbon monoxide and oxides of nitrogen are regarded as pollutants and it is therefore undesirable that such gases should be emitted by the exhausts of internal combustion engines.

Conventional diesel engines in which the diesel fuel is ignited by contact with a charge of air compressed in the engine cylinder do not produce oxides of nitrogen in their exhausts because the temperatures reached in the engine cylinders are lower than in the case of spark ignition gas engines. However diesel engines are generally of a heavy construction to withstand the very high compression ratios required and are not therefore generally suitable for modern motor cars and similar applications.

SUMMARY OF THE INVENTION

The invention provides an internal combustion engine having a fuel ignition chamber formed from a heat insulating material to retain the heat emitted by burning fuel. Fuel is injected into the ignition chamber to be preheated thereby and a permanently open restricted flow passage interconnects the ignition chamber with an engine combustion chamber whereby air compressed therein is forced into the ignition chamber with the preheated fuel. The resulting expansion of the burning mixture forces the mixture through the restricted passage into the combustion chamber to complete combustion with the air therein.

By preheating the fuel to a temperature at which spontaneous combination takes place with air, an over-rich mixture is not required to ensure ignition. Thus complete combustion of the fuel in the cylinder can be obtained, avoiding the emission of carbon monoxide in the exhaust. Furthermore, because the fuel ignites spontaneously, the ultimate temperatures reached in the cylinders are lower so that the formation of oxides of nitrogen is reduced or eliminated. The preheating of the fuel to a temperature at which it ignites spontaneously with the air charge avoids the necessity of the high compression ratios and therefore heavy structure generally required in diesel engines. The permanently open restricted flow passage between the ignition chamber and engine combustion chamber ensures that combustion does not take place immediately when fuel is injected into the chamber to be preheated, but is delayed until the air pressure is raised in the chamber by compression of an air charge in the engine combustion chamber.

DESCRIPTION OF THE PREFERRED EMBODIMENTS

Figure 1:
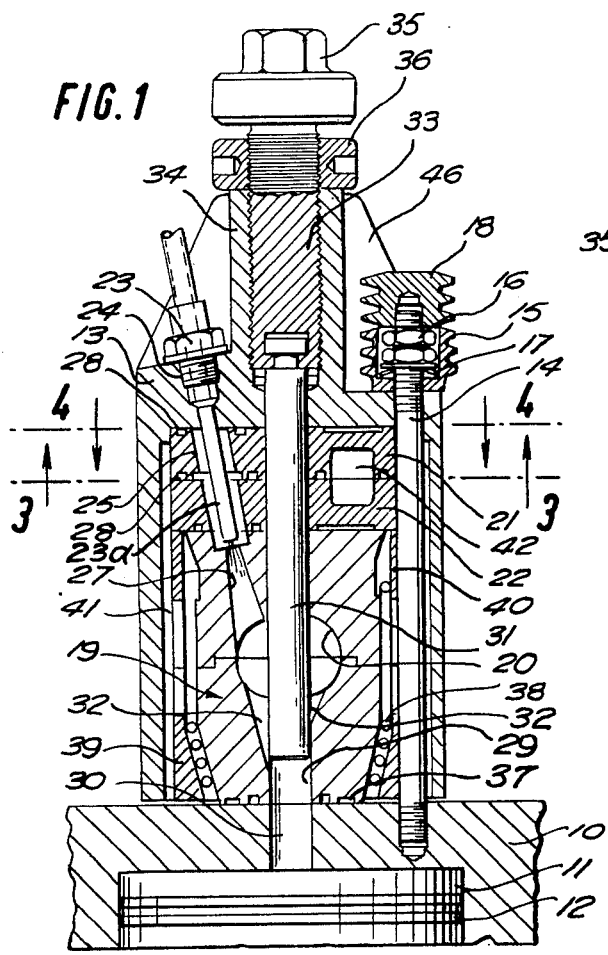
FIG. 1 is a cross-sectional view through a part of an internal combustion engine.
Figure 2:
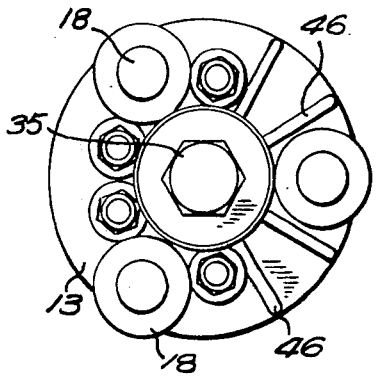
FIG. 2 is a plan view of the arrangement shown in FIG. 1.
Figure 3:
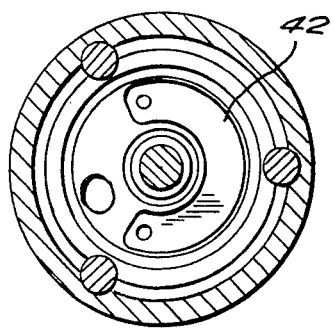
FIG. 3 is a section on the line 3—3 of FIG. 1.
Figure 10:
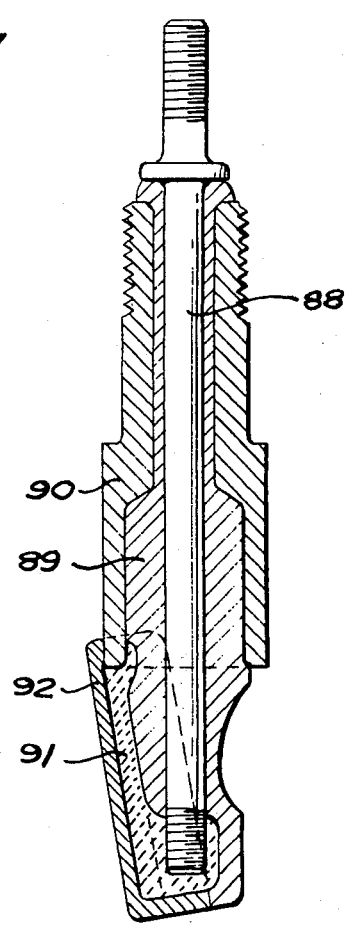
FIG. 10 is a detail view of part of the embodiment of FIG. 9.

Reference is first made to the embodiment of FIGS. 1 to 4. A part of a cylinder head of a four stroke internal combustion gas engine is illustrated in FIGS. 1 and 10 and includes a cylinder 11 containing a reciprocating piston 12.

An inverted cup-shaped housing 13 is secured to the top of the cylinder head 10 by studs 14. The upper end of each stud projects through the base of the housing into an externally finned alloy thimble. Two nuts 16 are tightened against Belville washers 17 which in turn bear on the base of the thimble to hold the housing in place. The Belville washers 17 permit a slight movement of the housing for thermal expansion and the finned thimble protects the washers against heat. An externally finned aluminium alloy cap 18 is screwed onto the end of each stud to assist in dissipating heat from the stud.

The housing contains an ignition chamber indicated generally at 19 which comprises upper and lower blocks formed from thermally insulating electrically non-conductive silicon nitride ceramic. The blocks are formed with a near spherical chamber 20 between them in which fuel is ignited as described later.

The lower end of the ignition chamber 19 rests on the top face of the cylinder head 10 and two superimposed metal plates 21, 22 respectively are located between the top of the chamber and the base of the housing 13.

A conventional fuel injector 23 is mounted in a bore 24 in the base of the housing 13 and a nozzle 23a of the injector extends through bores 25, 26 in the blocks 21, 22 respectively into a passage 27 through the upper block of the ignition chamber 19 which passage leads in a generally tangential direction to the cavity 20. Thus fuel delivered by the injector 23 to the cavity swirls around and deposits on the cavity. Wills ring seals are provided around the bores 25 and 26 between the plate 21 and the bottom of the housing 13, the plate 21 and plate 23, and the plate 22 and the upper face of the ignition chamber as indicated at 28.

A bore 29 leads from the bottom of the cavity to the bottom face of the ignition chamber 19 where it registers with the bore 30 extending through the top of the cylinder head 10 to the cylinder 11. A valve rod 31, which may be formed from thermally insulating silicon nitride similar to that of the ignition chamber 19, extends into the housing from the upper end thereof through the plates 21, 22, the upper block of the ignition chamber of the cavity 20 and engages in the bore 29. Eight straight slots 32 (only two of which can be seen) extend along the bore from the cavity 20 at spaced locations around the bore 29. As the slots extend from the cavity they reduce in depth and each slot terminates at a different location away from the cavity 20. The slots provide a restricted passage, at least one slot of which is permanently open between the cavity 20 and the cylinder 11. The rod 31 can be raised and lowered by a mechanism to be described and when the rod is in its lowermost position of travel only the longest of the slots 32 is open to provide a passage between the cavity 20 and the cylinder. When the rod is in its uppermost position all the slots are open to provide a passage between the cavity 20 and cylinder. The rod 31 may also be fully withdrawn from the bore 29 to further increase flow through the bore. By varying the restriction of flow between the cavity 20 and the cylinder 11, the timing of the delivery of compressed air from the cylinder 11 by the piston 12 into the cavity 20 can be varied thus providing a variation in the timing of the engine ignition.

The upper end of the valve rod 31 is secured to a stud 33 screwed into an upstanding boss 34 on the housing. The stud 33 is formed at its upper end with an hexagonal head 35 for adjustment by a spanner and a lock nut 36 is provided for securing the stud in the required adjusted position for a particular engine timing.

The lower face of the ignition chamber 19 is sealed to the top surface of the cylinder head 10 by a Wills seal 37 located in a groove encircling the lower end of the bore 29 in the block.

The ignition chamber 19 is encircled by an electrical heating coil 38 connected in the engine electrical system. The coil has a sufficient capacity for heating the ignition chamber to a temperature of 600° to 1000°C to ignite fuel located within the cavity 20 for starting the engine. The lower part of the heating coil is housed between a sleeve 39 encircling the lower part of the ignition chamber 19 and located between a downwardly facing shoulder on the chamber and the cylinder block. The upper part of the heating coil is encircled by a sleeve 40 encircling the upper part of the ignition chamber and located between an upwardly facing shoulder on the upper block of the ignition chamber and the metal plate 22. An air gap 41 is provided between the outer periphery of the ignition chamber 19 and the sleeves 39, 40. The inner periphery of the wall of the housing 13 provides heat insulation between the ignition chamber and the housing.

Figure 4:
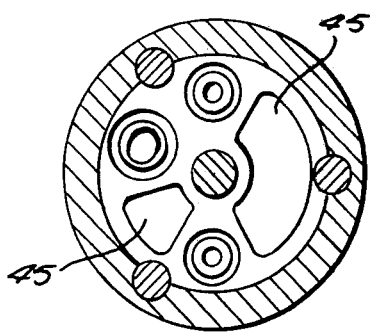
FIG. 4 is a section on the line 4—4 of FIG. 1.

The metal plates 21, 22 are separated by an arcuate coolant passage 42 which communicates through inlet and outlet ports 43, 44 shown in FIG. 4 with the oil lubrication system of the engine so that the oil flowing through the engine system serves as a coolant for the plates 21, 22. If necessary an oil cooler may be provided in the system.

Recesses 45 are cut in the top face of the plate 21 to reduce the area of contact between the plate and the base of the housing and thereby reduce the flow of heat from the plate to the housing. The upper part of the housing is formed with radial fins 46 to dissipate any heat reaching the housing.

Each engine cylinder is provided with an ignition chamber in communication with the cylinder as described above and a fuel injection system is provided which delivers charges of fuel through the injectors 34 at the appropriate points in the engine cycle. The cylinders have conventional air inlet and exhaust valves operated by a cam shaft or cam shafts in conventional manner. In the case of a two-stroke engine the cylinders are provided with conventional inlet and outlet ports opened and closed by the pistons in conventional manner.

When the piston 12 of the cylinder 11 rises from the bottom of its stroke having drawn in a fresh charge of air the air in the cylinder is compressed. At an appropriate point in the engine cycle of the order of 15° to 25° before top-dead-center of the piston, a charge of fuel is delivered by the injector 34 into the cavity 20. When the engine has been running for some time, the temperature of the ignition chamber 19 will be of the order of 800° to 1200°C and the fuel will be rapidly heated in the cavity to this temperature. When the air from the cylinder 11 is forced into the cavity 20 it will be heated and spontaneous ignition with the heated fuel will occur. The resulting expansion of the burning mixture will force the mixture out of the cavity 20 into the cylinder 11 where combustion of the charge with the remaining air will be completed in the cylinder to effect a working stroke of the piston 12. When the engine is started from cold the ignition chamber 19 is initially heated to a temperature in the region of 600° to 1000°C using the electric heating coil 38. The block is then hot enough to heat the fuel injected into the cavity 20 to a temperature sufficiently high to cause spontaneous ignition with air admitted into the cavity at the extended cycle times when the engine is turned over at a relatively low speed. Once the engine is running, the ignition chamber 19 is heated by one combustion of fuel to heat the next charge of fuel for rapid spontaneous combustion. It is believed that with this arrangement complete combustion of the fuel charge will take place and the resulting exhaust gases will contain a negligible amount of carbon monoxide. Furthermore it is believed that the spontaneous ignition of the fuel, as in the case of a conventional Diesel engine, will result in lower combustion temperatures within the cylinder than in conventional gas engines, thereby reducing or eliminating the nitrogen in the air charge to form oxides of nitrogen.

The vertical position of the valve rod 31 is adjusted to vary the restriction between the cylinder 11 and cavity 20 so that the point in the engine cycle when compressed air from the cylinder is forced into the cavity 20 is varied to vary the ignition timing.

Although manual operation is intended for the arrangement shown, it would be possible to connect the valve rod to a governor driven by engine speed to vary the timing for conjunction with a conventional engine load sensor, e.g. a vacuum operated device responsive to inlet manifold pressure.

Figure 5:
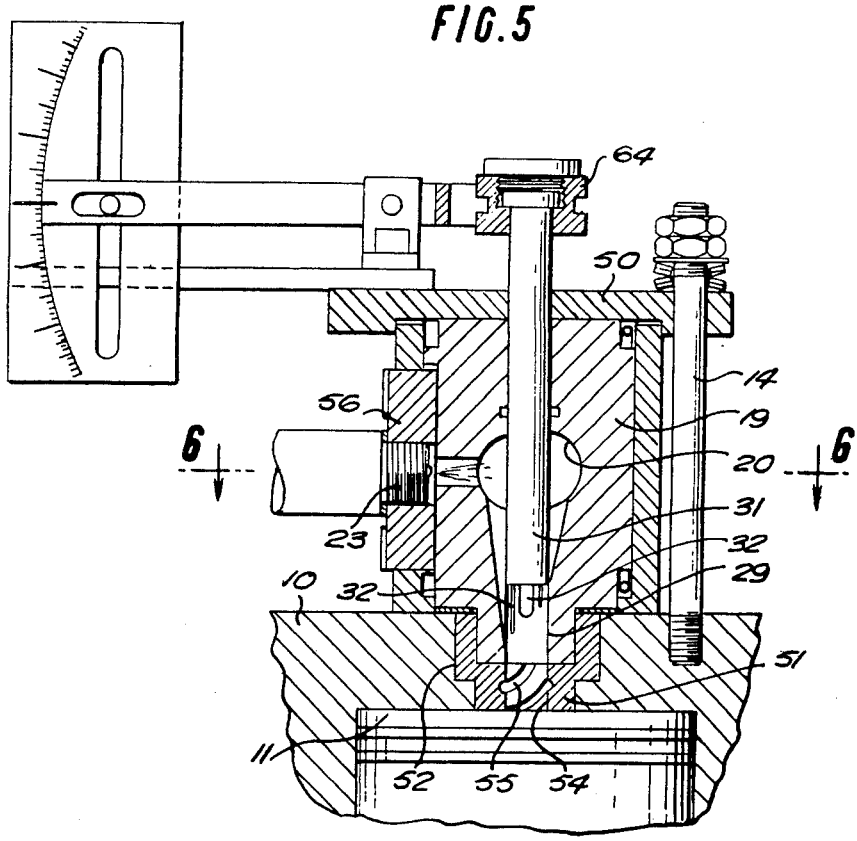
FIG. 5 is a similar view to FIG. 1 showing a further embodiment of the invention.
Figure 6:
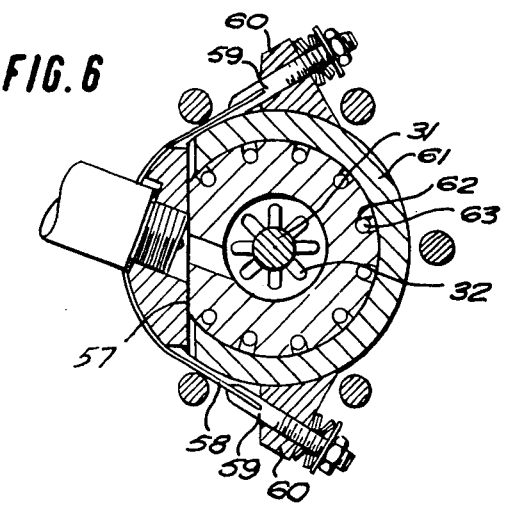
FIG. 6 is a section on the line 6—6 of FIG. 5.

FIGS. 5 and 6 show a generally similar arrangement to that shown in FIGS. 1 to 4 and like parts have been allotted like reference numerals. In this case the housing 13 is omitted and the ignition chamber 19 is secured to the cylinder head 10 by a plate 50 clamped by studs 14 to the cylinder head. The lower end of the ignition chamber 19 is formed with a downwardly extending spigot 51 which engages in a recess 52 formed in a block 53 seated in the cylinder head. The recess 52 has a bore 54 interconnecting the engine cylinder 11 with the bore 29 and the bore 54 has helically wound grooves 55 in the surface thereof to impart a swirl into the burning mixture passing from the cavity 20 to the cylinder 11 to enhance intermixing of the burning mixture with the air in the cylinder.

The fuel injector 23 is mounted in a side block 56 held against a flat surface 57 formed on the side of the ignition chamber 19 by a metal band 58 the ends of which are secured to studs 59 which are held in blocks 60 located on either side of a sleeve 61 encircling the ignition chamber. The ignition chamber is formed with vertical grooves 62 in which the elements 63 of the heating coil are arranged. The valve rod 31 for controlling flow between the cavity 20 and the engine cylinder is operated by an engine speed controlled governor (not shown) in conjunction with an engine load responsive device through a collar 64 at the upper end of the valve rod. The arrangement is such that the valve is lowered to increase the restriction between the cavity 20 and cylinder as engine speed falls thus delaying the passage of air from the cylinder 11 to the cavity 20 and thereby delaying ignition. As engine speed rises the valve 30 is arranged to be lifted, thus reducing the restriction between the cavity 20 and engine cylinder 11 and thereby advancing the ignition of fuel in the cavity 20.

Figure 7:
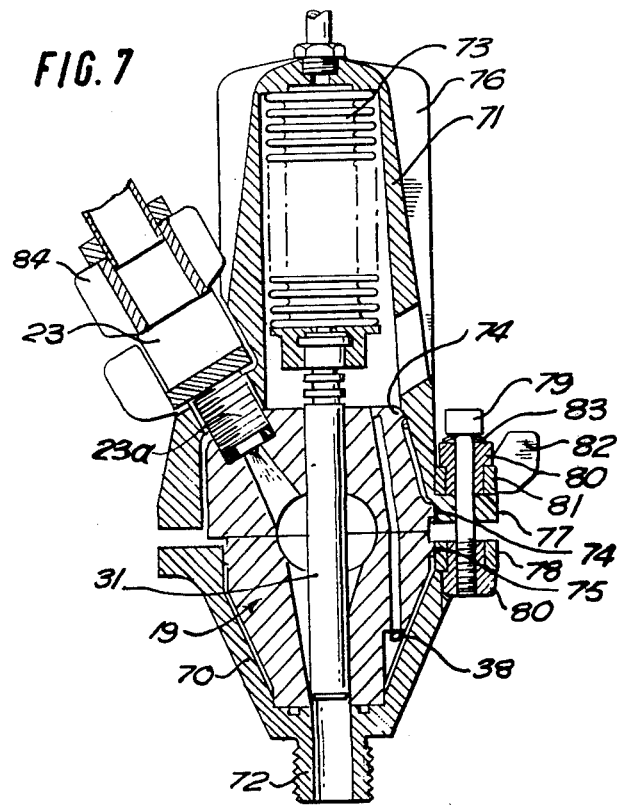
FIG. 7 is a sectional view of yet a further embodiment of the invention.
Figure 8:
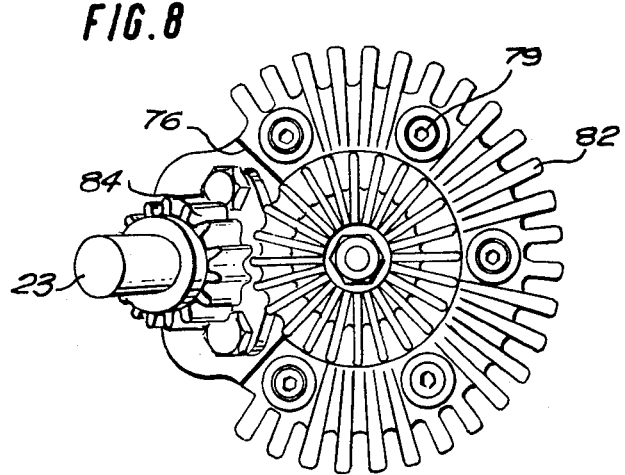
FIG. 8 is a plan view of the arrangement shown in FIG. 7.

The embodiment shown in FIG. 7 has an ignition chamber 19 mounted in a two-part housing 70, 71, the lower part 70 having an externally screw-threaded spigot 72 to screw into the aperture 30 in the cylinder head on the engine. The valve rod 31 in this case is raised and lowered by a bellows 73 located in the upper part 71 of the housing and connected to the oil circulation system of the engine so that oil pressure which rises and falls with engine speed expands and contracts the bellows to raise and lower the valve rod 31 and thereby vary the ignition timing.

The upper part of the ignition chamber 19 located in the upper housing part 71 has raised projections 74 around its periphery which engage the inner surface of the housing, so that the area of contact between the ignition chamber and upper housing part is minimised to minimise the heat loss from the chamber to the housing. The lower part of the ignition chamber has similar projections 75 which space the chamber from the lower housing part 70. The upper part of the housing has radial fins 76 to dissipate any heat in the housing.

The upper and lower parts of the housing have oppositely spaced flanges 77, 78 respectively which are secured together by bolts 79 which are screwed into low thermal conductivity bushes 80 mounted in the flanges. A C-shaped ring 81 is secured to the upper flange 77 by the bolt 79 and is provided with a series of radial fins 82 to assist in dissipating heat. Disc springs 83 are provided between the heads of the bolts 79 and the bushes 81 to permit limited movement between the housing parts to enable thermal expansion to take place. Heat dissipated by the finned ring 81 prevents thermal fatigue of the disc springs 83. The fuel injector 23 is also provided with fins 84 to dissipate heat from the injector body.

Figure 9:
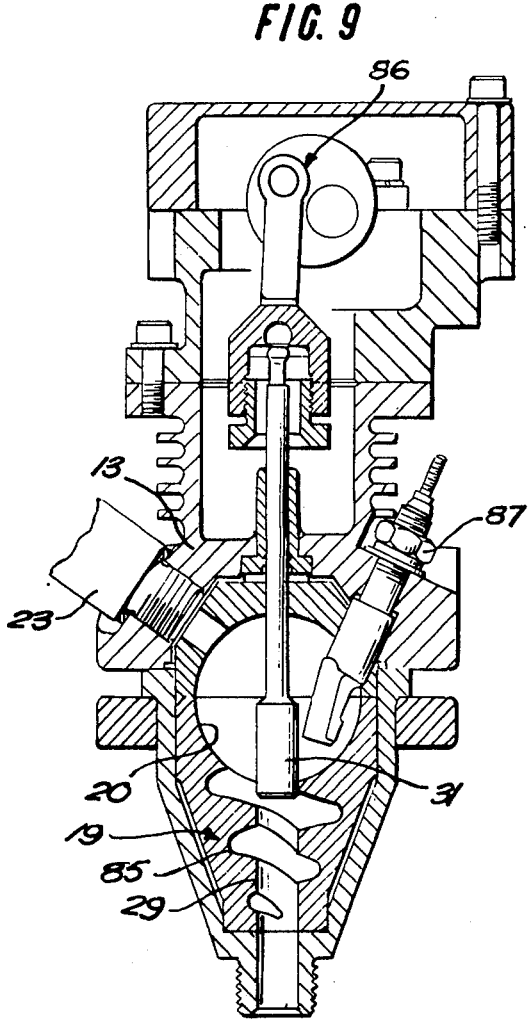
FIG. 9 is a sectional view of still a further embodiment of the invention.

FIGS. 9 and 10 show yet a further arrangement wherein the slots 32, which interconnect the cavity 20 in the ignition chamber 19 with the engine cylinder 11, are replaced by a spiral groove 85 wound around the bore 29 in the lower block of the ignition chamber. The depth of the groove reduces as the groove extends away from the cavity 20 so that by adjustment of the valve rod 31, the restriction between the cavity 20 and engine cylinder is varied as in the arrangements described above. In this case the valve rod 31 is raised and lowered by a crank mechanism indicated at 86 which is moved by an engine governor (not shown) in conjunction with an engine load responsive device. The crank mechanism for all the engine cylinders are linked by universal couplings. A cam operated clamping device is provided for holding the crank mechanism in the adjusted position. The heater coil 38 is replaced by a heater element 87 mounted on the housing 31 and projecting into the cavity 20. The element is shown in greater detail in FIG. 10 to which reference will now be made. The element comprises a central electrically heated electrode 88 enclosed, for the greater part of its length, in a thermally insulated silicon nitride sleeve 89, which is in turn enclosed in a metal sleeve 90. THe metal sleeve 90 stops short of the end of the element and a layer of thermally and electrically conducting silicon nitride 91 is coated over the lower part one side of the silicon nitride sleeve 89 and over the tip of the electrode 88. Thus the layer 91 is heated by the electrode 88. The layer 91 is enclosed in a steel sheath 92 which protects the layer 91. The sheath 92 provides a hot spot which is disposed directly opposite the fuel injector 23 in the cavity 20 so that fuel is sprayed from the injector onto the hot spot. Air swirling around the cavity 20 from the passage 85 reaches the heated fuel from the hot spot and spontaneously ignites therewith.

I claim:

1. An internal combustion engine, comprising: a fuel combustion chamber, a fuel ignition chamber formed from a heat insulating material to retain the heat emitted by combusted fuel in the engine for preheating fuel injected therein, means to inject fuel into said ignition chamber, a combustion passage interconnecting said ignition chamber with said combustion chamber whereby air compressed in said combustion chamber is forced into said ignition chamber with preheated fuel and the resulting expansion of the burning air and fuel mixture forces said mixture through said combustion passage into said combustion chamber to complete combustion of said fuel with the air therein, wherein the improvement comprises forming the ignition chamber including said combustion passage from a synthetic ceramic material, at least one groove extending along said combustion passage, said at least one groove increasing in depth towards said ignition chamber end thereof, an obdurating valve member formed from a synthetic ceramic extending from said ignition chamber into said combustion passage to close the latter and leaving said groove open, and means to adjust said valve member along the axis of said combustion passage to vary the length of said groove covered by said valve member and thereby vary the flow restriction between said combustion chamber and said ignition chamber.

2. An engine as claimed in claim 1, further comprising heater means for heating said ignition chamber to a temperature at which fuel contained therein ignites spontaneously with air for starting said engine.

3. An engine as claimed in claim 2 wherein said heater means comprise electric heating elements.

4. An engine as claimed in claim 2 wherein said heater means comprise an electrically heated member projecting into said ignition chamber.

5. An engine as claimed in claim 1, wherein a plurality of said at least one groove are positioned around said combustion passage, said grooves each having a different length and extending linearly along said combustion passage from the ignition chamber end thereof.

6. An engine as claimed in claim 1, wherein said at least one groove is wound helically around said combustion passage.

7. An engine as claimed in claim 1, wherein said valve member is adapted to be manually adjusted.

8. An engine as claimed in claim 1, further comprising means for adjusting said valve member in accordance with engine speed and load.

9. An engine as claimed in claim 8, wherein said means for adjusting comprise a crank mechanism controlled by a governor dependant on engine speed and load.

10. An engine as claimed in claim 8, wherein said means for adjusting comprise a fluid pressure operated bellows controlled in accordance with engine speed and load.

11. An engine as claimed in claim 1, wherein said ignition chamber is formed from silicon-nitride ceramic material.

12. An engine as claimed in claim 11, further comprising a housing mounted to said engine, said ignition chamber is enclosed in said housing and said means to inject fuel are mounted in said housing.

13. An engine as claimed in claim 12, wherein said housing is cup shaped having a side wall which encircles and is spaced from the outer periphery of said ignition chamber, said housing further including a bottom wall spaced from said ignition chamber by a block having a passageway for flow of coolant, said means to inject fuel being mounted in the base of said cup shaped housing and said block including a bore into said ignition chamber through which said means to inject extends.

14. An engine as claimed in claim 1, further comprising a plurality of cylinders each having a combustion space, wherein an ignition chamber is provided for each of said cylinders.

* * * * *